March 14, 1967  R. B. SCHAAF  3,308,636
SELF-CONTAINED COOLER
Filed Oct. 22, 1965

INVENTOR.
RONALD B. SCHAAF
BY
*Naylor & Neal*
ATTORNEYS

United States Patent Office 3,308,636
Patented Mar. 14, 1967

3,308,636
SELF-CONTAINED COOLER
Ronald B. Schaaf, 127 Milton St.,
San Francisco, Calif. 94112
Filed Oct. 22, 1965, Ser. No. 500,846
7 Claims. (Cl. 62—400)

The present invention relates to a device to effect the cooling of fluid reservoirs and more particularly is directed to such a device adapted to cool modern beer kegs of the "gravity flow" type.

In the draft beer art, beer is conventionally supplied in kegs which are subjected to internal pressure to effect the discharge of beer therefrom. Typically, these kegs are provided with but one opening at their upper extremity to effect both the introduction of compressed gas and the discharge of beer. This type of keg has the advantage that beer may be supplied at a level above that of the keg. However, it has the disadvantage that some pumping mechanism must be provided to pressurize the keg. This type of keg also has the disadvantage that pumping must be carefully controlled to provide a steady flow of beer while, at the same time, avoiding overfoaming.

In an effort to overcome the disadvantages incumbent with the supply of beer from pressurized kegs, recently kegs have been developed to effect the discharge of beer by gravity flow. These "gravity flow" kegs simply comprise a tank provided with a tap opening at its lower extremity and a vent opening at its upper extremity. To effect the discharge of beer from this type of keg it is merely necessary to tap the discharge opening and open the vent opening. The "gravity flow" beer keg has the obvious attribute that it avoids the necessity for a pumping mechanism and the disadvantages incumbent therewith. It has the disadvantage, however, that it is not capable of effecting the discharge of beer at a level above the keg.

The latter disadvantage is particularly objectionable where it is desired to cool the keg by submersing it in a coolant, such as ice water, contained in a tanklike vessel. Specifically, with the tap at the lower extremity of the keg, it is not possible to submerse the keg in a wash tub or similar receptacle and still maintain the tap at an operative location. Thus, the gravity flow type of keg is not well facilitated for use in improvised home and outdoor environments as is the pressure type keg.

It is, accordingly, a principal object of the present invention to provide a cooler for gravity flow type kegs which overcomes the disadvantages incumbent therewith.

Another and related object of the invention is to provide an inexpensive cooler for gravity flow type beer kegs which is well facilitated for outdoor and home use.

Yet another object of the invention is to provide a cooler for gravity flow type beer kegs which facilitates keg tapping therethrough while, at the same time, the maintenance of coolant around the keg.

A further object of the invention is to provide a cooler for gravity flow type kegs which facilitates the handling of the keg both prior to and after tapping.

Still a further object of the invention is to provide a cooler for gravity flow type beer kegs which is well adapted for use with commercially available tapping equipment.

Basically the present invention may be said to reside in a cooler for use in combination with a fluid reservoir having a tap opening in the lower portion thereof and a faucet shank adapted to effect tapping of said tap opening. The cooler comprises a tank adapted to simultaneously contain a fluid coolant and receive the reservoir therein in upright condition. The tank includes a base adapted to support the reservoir in an upright position; a continuous side wall sealingly secured around and extending upwardly from the base by a distance substantially equal to or greater than the height of the reservoir, and an opening in the side wall adapted to be aligned with the tap opening of a reservoir received in the tank. The opening is adapted to receive a faucet shank therethrough to effect tapping of the reservoir and is provided with sealing structure to establish a fluid type seal with the shank.

The detailed structure of the invention and the foregoing and other objects will become more apparent when viewed in the light of the accompanying drawings wherein.

Figure 1:
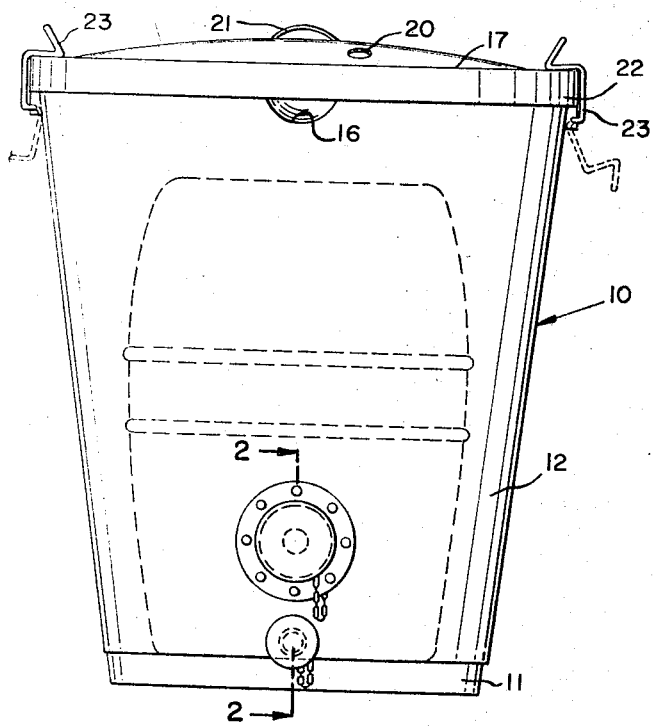
FIG. 1 is a front elevational view showing the cooler with the tap and drain openings thereof in capped condition.

Referring now to the drawings in detail, the inventive cooler is designated therein in its entirety by the numeral 10. The cooler comprises a tanklike structure defined by a bottom or base 11 and a continuous side wall 12 sealingly secured around and extending upwardly from the base. The side wall 12 defines an open upper end 13 through which a gravity flow beer keg 14 or similar fluid reservoir may be inserted into the tank. When inserted into the tank, as shown in FIG. 3, the keg 14 rests on the bottom 11 in an upright condition.

In the preferred embodiment illustrated, the side wall 12 defines a substantially frusto-conical surface extending upwardly from the bottom or base 11 by a distance equal to or greater than the height of the keg 14 to be received therein. The tank defined by the bottom 11 and side wall 12 is also sufficiently larger than the keg 14 to permit a coolant, such as ice water 15, to be contained therein around the keg 14. Hand holds 16 are formed in opposed surfaces of the side wall 12 and a lid 17 is adapted to be received over the upper end 13. The lid 17 has formed therein a vent opening 20 to avoid the creation of a vacuum within the tank as beer is withdrawn from the keg 14, as will become more apparent subsequently. The structure of the lid 17 is completed by a handle 21 secured to the upper surface thereof and an annular lip 22 extending downwardly therefrom and adapted to be received around the upper end 13 of the side wall 12. To secure the lid in closed condition, twin fasteners 23 are secured to opposed portions of the side wall 12. These fasteners are adapted to be swung between the lid engaging and disengaging positions illustrated in solid and phantom lines, respectively, in FIG. 1.

Figure 3:
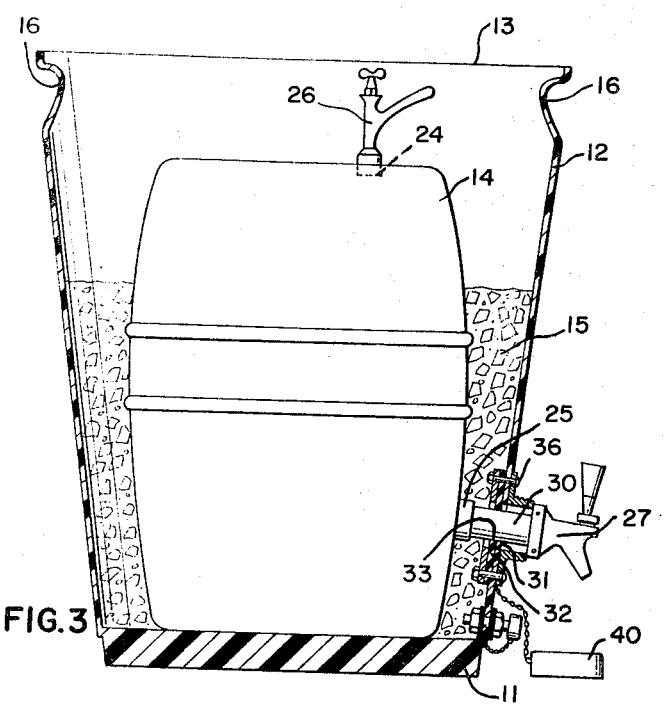
FIG. 3 is a sectional elevational view, taken from the side, showing the cooler and a keg housed therein in the tapped condition.

It is to be understood that the gravity flow keg 14 and tapping structure therefore illustrated in FIG. 3 is of conventional nature and forms no part of the present invention. The keg 14 comprises a barrel-shaped structure having a vent opening 24 in the upper portion thereof and a tap opening 25 in the lower portion thereof. These openings are normally maintained in closed condition until such time as it is desired to tap the keg. Tapping of the keg is effected through means of structure including a vent valve 26 adapted to be inserted into the opening 24 and a draft faucet 27 having a shank 30 adapted to be inserted into the opening 25. Both the valve 26 and faucet 27 are adapted to facilitate tapping of the openings into which they are inserted and to control fluid flow through these openings.

From FIG. 3 it can be seen that the vent valve 26 may be readily inserted into the opening 24 through the upper end 13 and that the side wall 12 extends upwardly by a distance sufficient to permit the lid 17 to be secured in place without interference with the vent valve. This figure also illustrates the opening and sealing structure which facilitates insertion of the shank 30 through the side wall 12 and into the tap opening 25 of the keg 14. This structure includes an aperture 31 formed in the side wall of a diameter considerably larger than the shank 30 and a resilient grommet 32 sealingly secured around the aperture 31 and having therethrough a substantially circular opening 33 of a diameter less than that of the shank 30. The grommet 32 is secured to the inner surface of the side wall 12 by annular flanges 34 and 35 disposed on opposite sides of the wall and bolts 36 extending through aligned openings in the flanges and grommet. The bolts 36, as can be seen from FIG. 2, function to sandwich the grommet 32 between the opposed surfaces of the side wall 12 and flange 34. Through this arrangement, when the shank 30 is forced through the opening 33, a seal is established which prevents the escape of fluid coolant around the shank.

Figure 2:
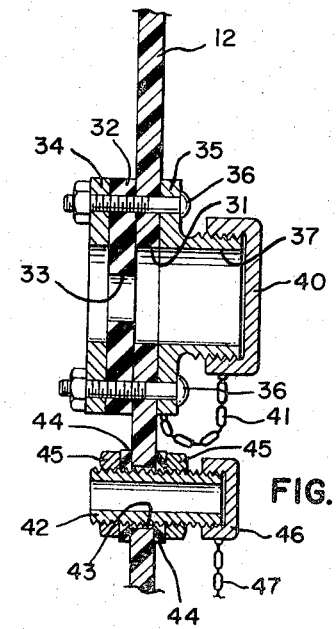
FIG. 2 is a sectional view taken on plane 2—2 of FIG. 1.

FIG. 2 illustrates the aforedescribed structure cooperating with the tap opening 31, cap structure for this opening when the shank 30 is removed therefrom, and drain structure to facilitate the drainage of coolant from the cooler. The cap structure simply comprises an externally threaded sleeve 37 formed integrally with and extending outwardly from the flange 35 and an internally threaded cap 40 adapted to be received over the sleeve. A safety chain 41 is secured between the cap 40 and flange 35 to prevent loss of the cap when it is removed. The drain structure comprises an externally threaded nipple 42 extending through an opening 43 in the side wall 12 and sealingly secured in place by resilient washers 44 and nuts 45 received therearound. An internally threaded cap 46 having a safety chain 47 secured thereto is threadably received on the nipple 42 to effect selective closure thereof.

The provision of the selectively operable sealing caps 40 and 46 on the openings in the side wall 12 has the advantage that liquid coolant may be confined in the cooler 10 independent of the tapped condition of the keg 14. Thus, the cooler may be utilized to effect cooling of the keg 14 prior to tapping. As a result, cooling may be effected during storage or transport of the keg and the handling of the keg and coolant therefor is greatly facilitated.

Figure 4:
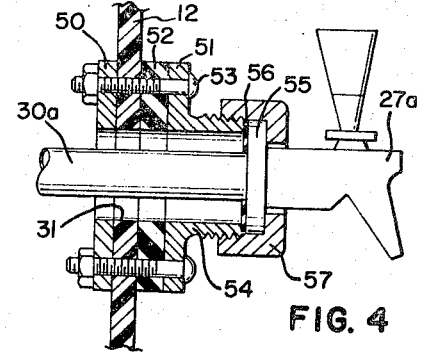
FIG. 4 is a sectional elevational view similar to FIG. 2, but showing a tap shank extending through the cooler and an alternative construction to effect sealing around this shank.

Referring now to FIG. 4, therein is illustrated an alternative structure to facilitate sealing of the tap opening or aperture 31 when the shank 30a of a draft faucet 27a is inserted therethrough. This structure comprises: annular flanges 50 and 51 disposed around the opening 31 on opposite sides of the side wall 12; a resilient annular gasket 52 sandwiched between the wall 12 and the flange 51; bolts 53 extending through the side wall 12 and the elements 50, 51 and 52 to maintain these elements in fixed position; an externally threaded sleeve 54 formed integrally with and extending outwardly from the flange 51; an annular collar 55 fixed to and extending around the faucet 27a in opposition to the sleeve 54; an annular gasket 56 interposed between the sleeve 54 and collar 55, and an annular coupling 57 rotatably received around the collar 55 in abutting relationship with the outer surface thereof and having an internal portion threadably received on the sleeve 54. With this structure, tapping of the keg 14 is effected simply by inserting the shank 30a through the aperture 31 and into the opening 25 and then tightening the coupling 57 onto the sleeve 54. It is noted that the FIG. 4 structure is contrasted to that of FIGS. 2 and 3 in that it requires the use of a specially fabricated draft faucet 27a having a sealing collar 55 therearound.

The various components of the inventive cooler may be fabricated from any number of suitable materials. For example, it is anticipated that the tank and lid therefor may be fabricated of materials such as: vinyl plastic, fiberglass, aluminum or stainless steel. The fittings, gaskets and grommet may similarly be fabricated from any number of suitable alternative materials.

From the foregoing description, it is believed apparent that the present invention enables the accomplishment of the objects initially set forth herein. It is to be understood, however, that the invention is not intended to be limited to the specific details of the embodiments illustrated and described in the exemplary application thereof. For example, it is anticipated that the components of the cooler could be assembled by techniques differing from those illustrated without materially departing from the invention and that the cooler might be employed for the dispensing of fluid from pressurized reservoirs. In the latter event, it would merely be necessary to direct the reservoir discharge conduit through the tap opening in the cooler side wall.

I claim:

1. A cooler for use in combination with a fluid reservoir having a normally closed discharge tap opening in the lower portion thereof and a faucet having a shank adapted to effect opening of said opening upon insertion thereinto, said cooler comprising:
   (a) a tank adapted to house said reservoir and contain a fluid coolant in contact therewith, said tank having:
      (1) a base wall to support said reservoir in upright condition when said reservoir is housed in said tank;
      (2) a continuous side wall sealingly secured around and extending upwardly from said base wall, said side wall being dimensioned to extend around said reservoir when said reservoir is housed in said tank, and
      (3) an opening in said side wall alignable with the tap opening of said reservoir when said reservoir is housed in said tank, the opening in said side wall being adapted to have the shank of said faucet inserted therethrough from the exterior thereof to effect opening of said tap opening;
   (b) sealing means operatively associated with the opening in said side wall to establish a substantially fluid tight seal with said faucet shank when said shank is received therethrough.

2. A cooler according to claim 1 wherein said side wall extends upwardly from said base wall by a distance at least equal to the height of said reservoir.

3. A cooler according to claim 2 wherein the upper extremity of said side wall defines an open top through which said reservoir may be passed and including a lid adapted to cover said top when said reservoir is either housed in or removed from said tank.

4. A cooler according to claim 1 wherein said sealing means comprises a resilient grommet sealingly secured around the opening in said side wall, said grommet having therein an aperture adapted to snugly receive said shank therethrough.

5. A cooler according to claim 1 wherein said sealing means comprises:
   (a) a sleeve sealingly secured around and extending outwardly from the opening in said side wall, and
   (b) a collar fixed to and extending around said shank, said collar being adapted to engage said sleeve to effect sealed closure thereof upon receipt of said shank in the opening of said side wall.

6. A cooler according to claim 1 including closure means to effect the fluid tight sealing of the opening in said side wall when said shank is removed therefrom.

7. A cooler according to claim 6 wherein said closure means comprises:
   (a) a sleeve sealingly secured around and extending outwardly from the opening in said side wall, and
   (b) a cap adapted to plug said sleeve.

(References on following page)

References Cited by the Examiner

UNITED STATES PATENTS

| | | | |
|---|---|---|---|
| 1,054,677 | 3/1913 | Cordley | 62—400 X |
| 1,078,214 | 11/1913 | Patnaude | 62—400 X |
| 1,086,425 | 2/1914 | Viney | 62—400 X |
| 1,576,912 | 3/1926 | James | 62—400 X |
| 1,711,494 | 5/1929 | Giese | 62—400 X |
| 2,001,040 | 5/1935 | Sweeney | 62—400 X |
| 2,003,050 | 5/1935 | Iselin | 62—400 X |
| 2,289,645 | 7/1942 | Geistert | 62—400 X |
| 2,792,692 | 5/1957 | Bryan | 62—400 X |

LLOYD L. KING, *Primary Examiner.*